(12) United States Patent
Shi et al.

(10) Patent No.: US 9,055,083 B2
(45) Date of Patent: Jun. 9, 2015

(54) INTERWORKING METHOD AND INTERWORKING CONTROL UNIT, METHOD AND SYSTEM FOR IMPLEMENTING SIMULATION SERVICES

(75) Inventors: Youzhu Shi, Shenzhen (CN); Qing Zhou, Shenzhen (CN); Lingzhi Mao, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 1080 days.

(21) Appl. No.: 12/398,644

(22) Filed: Mar. 5, 2009

(65) Prior Publication Data

US 2010/0002682 A1    Jan. 7, 2010

Related U.S. Application Data

(63) Continuation of application No. PCT/CN2007/071305, filed on Dec. 21, 2007.

(30) Foreign Application Priority Data

Dec. 30, 2006   (CN) .......................... 2006 1 0172793

(51) Int. Cl.
*H04L 12/66* (2006.01)
*H04L 12/28* (2006.01)
(Continued)

(52) U.S. Cl.
CPC ......... *H04L 65/1043* (2013.01); *H04M 3/2281* (2013.01); *H04M 3/42042* (2013.01);
(Continued)

(58) Field of Classification Search
CPC ................................................... H04W 24/00
USPC ......... 370/252, 260, 262, 282, 401, 389, 474, 370/466, 230–231, 352–356, 465–467, 410, 370/338
See application file for complete search history.

(56) References Cited

U.S. PATENT DOCUMENTS 7,359,373 B2 *  4/2008  Kuusinen et al. ............. 370/352
7,644,181 B2 *  1/2010  Plata Andres et al. ........ 709/239
(Continued)

FOREIGN PATENT DOCUMENTS

CN          1741633          3/2006
CN         01747470          3/2006
(Continued)

OTHER PUBLICATIONS

Marsie, B., et al., "IMS to PSTN/CS Interworking," IEEE Telecommunication 2003 ConTEL 2003, Jun. 2003, p. 701-704, vol. 2, 11-13.
(Continued)

*Primary Examiner* — Samina Choudhry
(74) *Attorney, Agent, or Firm* — Brinks Gilson & Lione (57) ABSTRACT

The present invention discloses a method for implementing simulation services, including the following: an interworking control unit obtains the CS domain network user identifier after detecting that the call signaling message from the CS domain network carries no CS domain network user identifier, puts the obtained user identifier into the SIP message, which is subsequently sent to the IMS network; the IMS network processes the PSTN/ISDN simulation services according to the user identifier. The present invention also discloses a system for implementing simulation service. The present invention makes it unnecessary to extend the existing SIP protocol and to perform signaling interaction between the IMS network and the interworking control unit for obtaining the user identifier, thus simplifying the implementation of the PSTN/ISDN simulation services.

20 Claims, 6 Drawing Sheets

(51) Int. Cl.
*H04L 29/06* (2006.01)
*H04M 7/12* (2006.01)
*H04M 3/22* (2006.01)
*H04M 3/42* (2006.01)

(52) U.S. Cl.
CPC .......... H04M3/42093 (2013.01); *H04M 7/123* (2013.01); *H04L 65/1016* (2013.01); *H04L 65/1006* (2013.01); *H04L 65/1069* (2013.01)

(56) References Cited

U.S. PATENT DOCUMENTS

| | | | |
|---|---|---|---|
| 2002/0110104 A1* | 8/2002 | Surdila et al. | 370/338 |
| 2005/0083909 A1* | 4/2005 | Kuusinen et al. | 370/352 |
| 2006/0077965 A1* | 4/2006 | Garcia-Martin et al. | 370/352 |
| 2006/0092925 A1* | 5/2006 | Svensson et al. | 370/352 |
| 2007/0008957 A1 | 1/2007 | Huang | |
| 2007/0211695 A1 | 9/2007 | Shi et al. | |
| 2010/0272088 A1* | 10/2010 | Buckley | 370/338 |

FOREIGN PATENT DOCUMENTS

| | | |
|---|---|---|
| CN | 1874328 A | 12/2006 |
| CN | 1882170 A | 12/2006 |
| WO | WO-2005039132 | 4/2005 |
| WO | 2006026901 A1 | 3/2006 |

OTHER PUBLICATIONS

First office action issued in corresponding Chinese patent application 200610172793.0, dated Nov. 21, 2008, and English translation thereof, total 11 pages.

Second office action issued in corresponding Chinese patent application 200610172793.0, dated Feb. 6, 2009, and English translation thereof, total 8 pages.

Front page of corresponding granted Chinese Patent No. 100550949 (Application No. 200610172793.0) citing prior art at Item (56), issued Oct. 14, 2009, 1 page only.

Search report issued in corresponding European patent application No. 07846131.6, dated Dec. 15, 2009, total 5 pages.

First office action issued in corresponding European patent application No. 07846131.6, dated Dec. 30, 2009, total 5 pages.

Second office action issued in corresponding European patent application No. 07846131.6, dated Feb. 11, 2013, total 5 pages.

WI3072 ETSI TS 183 016, V0.0.3, "Telecommunicaitons and internet converged services and protocols for advanced networking (TISPAN); PSTN/ISDN simulation services; malicious communication identification (MCID); protocol specification release 2," Jun. 2006, total 17 pages.

ETSI TS 129 163, V7.5.0, "Digital cellular telecommunications system, universal mobile telecommunications system (UMTS); interworking between the IP multimedia (IM) core network (CN) subsystem and circuit switched (CS) networks; (3GPP TS 29.163 version 7.5.0 Release 7)," Dec. 2006, total 148 pages.

ITU-T Q.731, "Stage 3 description for number identification supplementary services using signalling system No. 7: Calling line identification presentation(CLIP)", Mar. 1993, total 42 pages.

Patrick Luthi, "Draft revised H.246 'Interworking of H-series multimedia terminals with H-series multimedia terminals and voice/voiceband terminals on GSTN, ISDN and mobile networks'," International Telecommunication Union, Telecommunication Standardization Sector, Geneva, Apr. 3-13, 2006, total 176 pages.

Written Opinion issued in corresponding PCT application No. PCT/CN2007/071305, dated Mar. 27, 2008, total 3 pages.

3GPP TS 29.163 V7.5.0, "3rd Generation Partnership Project: Technical Specification Group Core Network and Terminals; Interworking between the IP Multimedia (IM) Core Network (CN) subsystem and Circuit Switched (CS) networks (Release 7)," Dec. 2006, total 146 pages.

* cited by examiner

INTERWORKING METHOD AND INTERWORKING CONTROL UNIT, METHOD AND SYSTEM FOR IMPLEMENTING SIMULATION SERVICES

CROSS-REFERENCE TO RELATED APPLICATIONS

This application is a continuation of International Application No. PCT/CN2007/071305, filed on Dec. 21, 2007, which claims priority to Chinese Patent Application No. CN200610172793.0, filed on Dec. 30, 2006, both of which are hereby incorporated by reference in their entireties.

FIELD OF THE INVENTION

The present invention relates to the field of service processing technologies, and in particular, to a method and a system for implementing the simulation services of the Public Switched Telephone Network/Integrated Service Digital Network (PSTN/ISDN); a method and a control unit for interworking between an IP Multimedia Subsystem (IMS) network and a Circuit Switched (CS) domain network.

BACKGROUND OF THE INVENTION

With maturity of the packet switching (PS) technologies, the circuit switching (CS)-based traditional telecom networks is developing toward PS-based broadband telecom networks. Using the Session Initiation Protocol (SIP) as a call control signaling of the PS telecom core network is one of the current technical trends. For example, both the International Telecommunications Union-telecom standards part (ITU-T) and the European Telecom Standard Institute (ETSI) currently use the IMS network architecture defined by the $3^{rd}$ Generation Project Partnership (3GPP) as a core network of the Next Generation Network (NGN).

In the new PS telecom network, the new PS terminal—SIP terminal gradually replaces the traditional terminal telephone set. In the Telecom and Internet converged Services and Protocols for Advanced Networking (TISPAN) affiliated to the ETSI, the services that are provided to the SIP terminal users in an NGN and have feature same as traditional services are collectively called Public Switched Telephone Network/Integrated Services Digital Network (PSTN/ISDN) simulation services. The TISPAN sets up multiple work items (WIs) to study the simulation services, for example, Originator Identifier Presentation (OIP), and Terminal Identifier Presentation (TIP), and Malicious Call Identification (MCID).

In the TISPAN standards, the service logics of the OIP, TIP, and MCID services are implemented on an Application Server (AS). The MCID service and the OIP service need to identify the calling party identifier of a session, and the TIP service needs to identify the called party identifier of a session. When a user is located in an IMS network, the user identifier is carried in the P-Asserted-Identity header field of the SIP message, and the P-CSCF inserts the P-Asserted-Identity header field that carries the user identifier into the SIP message.

Figure 1:
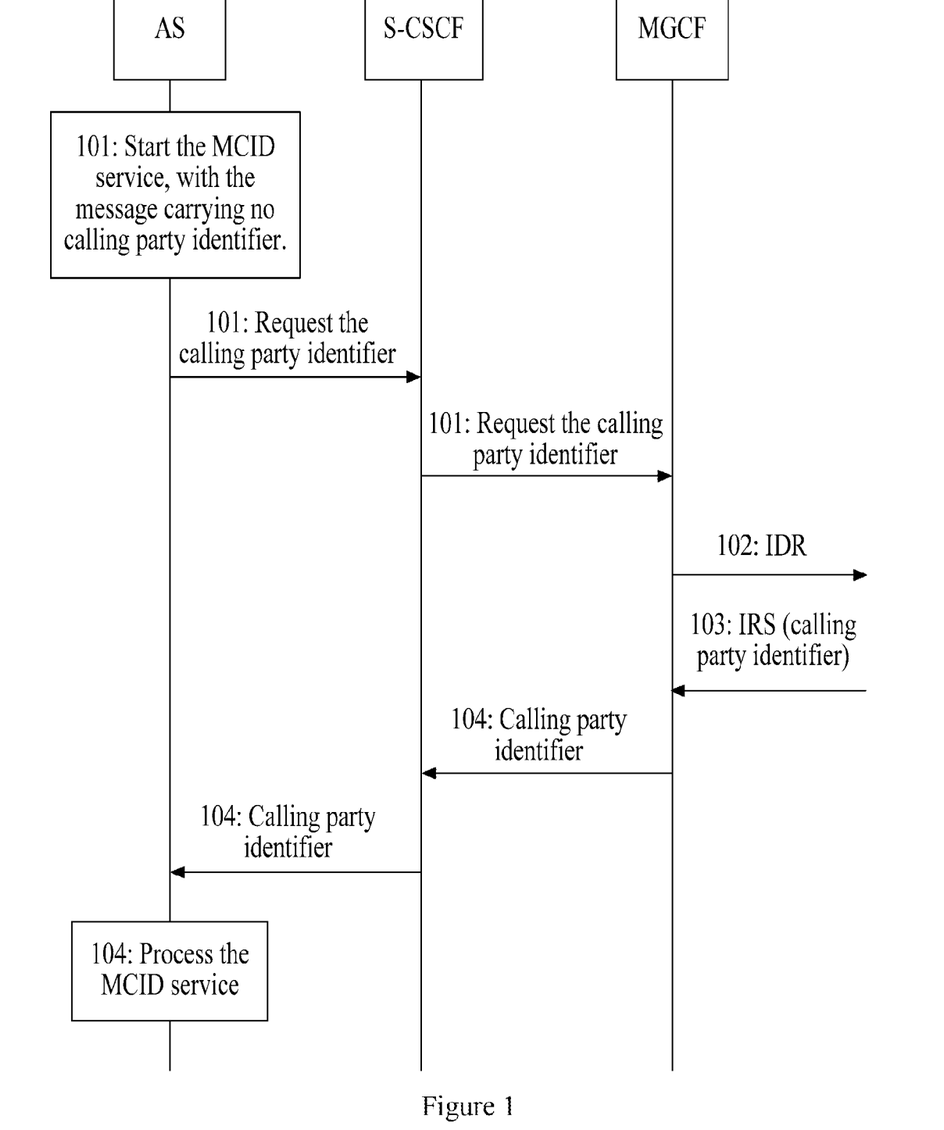
FIG. 1 shows the time sequence of implementing an MCID service in the prior art.

When the user is located in a CS domain network, the user identifier is transferred through the Calling Party Number parameter and the Connected Number parameter in a Signaling System No. 7 (SS7) message. To obtain the user identifier of the CS domain network from the IMS network, the Media Gateway Control Function (MGCF) unit needs to map the Calling Party Number parameter and the Connected Number parameter to the P-Asserted-Identity header field of the SIP message. However, the CS domain network does not require provision of the user identifier. Therefore, when an SS7 message does not carry the Calling Party Number parameter or the Connected Number parameter, the MGCF fails to obtain the user identifier of the CS domain network user, thus making it impossible to implement the subsequent services. To enable the IMS network to obtain the user identifier of the CS domain network user, at the TISPAN#11ter conference, the DT puts forward, in the 11tTD273 draft, a method for obtaining the calling party identifier from the MCID service. FIG. 1 shows the process of implementing an MCID service in the prior art, which includes the following steps:

Step 101: When handling the MCID service, the AS of the IMS network detects that the signaling message from the CS domain network does not carry calling party identifier, and hence requests the calling party identifier from the MGCF through an extended SIP message.

Step 102: Upon receiving the request for the calling party identifier, the MGCF sends an identification request (IDR) message to the CS domain network.

Step 103: Upon receiving the IDR message, the CS domain network returns the calling party identifier to the MGCF through an identification response (IRS).

Step 104: Upon receiving the IRS message, the MGCF sends the calling party identifier carried in the message to the AS. The AS performs MCID service processing according to the calling party identifier.

This method has the following weaknesses: Firstly, the existing SIP protocol needs to be extended, which makes it more difficult to implement; secondly, the AS needs to perform signaling interaction with the MGCF, which makes it more complex to process network interfaces and AS services.

SUMMARY OF THE INVENTION

The present invention provides a method and a system for implementing simulation services to simplify the implementation of the PSTN/ISDN simulation services.

The present invention also provides a method for interworking between the IMS network and the CS domain network, and provides an interworking control unit to simplify the interworking between the IMS network and the CS domain network.

The technical solution of the present invention is implemented in the following way.

A method for implementing simulation services, including:

obtaining, by an interworking control unit, the CS domain network user identifier after detecting that the call signaling message from the CS domain network does not carry CS domain network user identifier, and sending the obtained CS domain network user identifier to the IMS network; and processing, by the IMS network, the PSTN/ISDN simulation services according to the user identifier; and A simulation service implementation system, including:

a CS domain network, adapted to send a call signaling message to the interworking control unit;

an interworking control unit, adapted to send the obtained CS domain network user identifier to the IMS network after detecting that the call signaling message from the CS domain network carries no CS domain network user identifier; and an IMS network, adapted to process PSTN/ISDN simulation service according to the CS domain network user identifier sent from the interworking control unit.

An interworking control unit, including:

a default user identifier storage module, adapted to store the default CS domain network user identifiers; and a user identifier obtaining module, adapted to carry the user identifier read from the default user identifier storage module into a SIP message after detecting that the call signaling message from the CS domain network carries no CS domain network user identifier, wherein the SIP message is subsequently sent to the IMS network.

An interworking control unit, including:

a user identification detecting module, adapted to receive the call signaling message sent by the CS domain network, and send an obtaining indication to a user identifier obtaining module if detecting that the message carries no CS domain network user identifier; and the user identification obtaining module, adapted to send a request for user identifier to the CS domain network according to the obtaining indication sent by the user identifier detecting module, and put the user identifier sent by the CS domain network into the SIP message, which is subsequently sent to the IMS network.

A method for interworking between the IMS network and the CS domain network, including:

by an interworking control unit, obtaining the CS domain network user identifier after detecting that the call signaling message from the CS domain network carries no CS domain network user identifier, and sending the obtained user identifier to the IMS network.

Compared with the prior art, the interworking control unit of the present invention obtains the CS domain network user identifier actively after detecting that the call signaling message from the CS domain network carries no CS domain network user identifier of a call, and sends the user identifier to the IMS network. This makes it unnecessary to extend the existing SIP protocol and perform signalling interworking between the IMS network and the interworking control unit to obtain the user identifier, thus simplifying the interworking between the IMS network and the CS domain network and the implementation of the PSTN/ISDN simulation services.

DETAILED DESCRIPTION OF THE EMBODIMENTS

The present invention is hereinafter described in detail with reference to embodiments and accompanying drawings.

Figure 2:
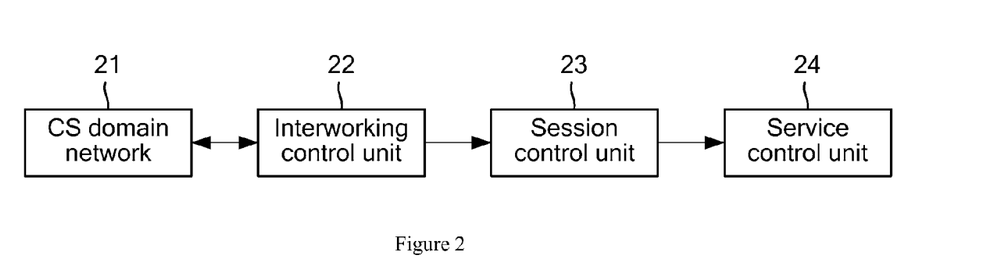
FIG. 2 shows the system structure for implementing the PSTN/ISDN simulation services according to an embodiment of the present invention.

FIG. 2 shows the system structure for implementing a PSTN/ISDN simulation service according to an embodiment of the present invention. As shown in FIG. 2, the system includes: a CS domain network 21, an interworking control unit 22, a session control unit 23, and a service control unit 24, wherein the session control unit 23 and the service control unit 24 are located in the IMS network domain. The function of each unit is described below:

The CS domain network 21 is adapted to send the call signaling message in the ISDN User Part (ISUP) or the Bearer Independent Call Control (BICC) protocol to the interworking control unit 22, receive the request for user identifier sent by the interworking control unit 22, and return a user identifier to the interworking control unit 22.

The interworking control unit 22 is adapted to send a request for user identifier to CS domain network 21 if detecting that the call signaling message received from a CS domain network 21 carries no of the CS domain network user identifier, put the user identifier returned by the CS domain network 21 into the SIP message, and send the SIP message to the session control unit 23.

The interworking control unit 22 may be an MGCF, or an Interworking Border Control Function (IBCF).

Alternatively, the interworking control unit 22 is adapted to store the default CS domain network user identifier, and if detecting that the call signaling message received from the CS domain network 21 carries no CS domain network user identifier of a call, put the stored default CS domain network user identifier into a SIP message and send the SIP message to the session control unit 23.

Alternatively, the interworking control unit 22 is adapted to store the default CS domain network user identifier, and after sending a request for user identifier to the CS domain network 21, if receiving no user identifier returned by the CS domain network 21, put the stored default CS domain network user identifier into a SIP message and send the SIP message to the session control unit 23.

The session control unit 23 is adapted to receive the SIP message that carries the CS domain network user identifier sent from the interworking control unit 22, and forward the message to the service control unit 24.

The session control unit 23 may be a CSCF in an IMS network.

The service control unit 24 is adapted to process PSTN/ISDN simulation services according to the SIP message that carries the CS domain network user identifier from the session control unit 23.

The service control unit 24 may be an AS in the IMS network.

Figure 3:
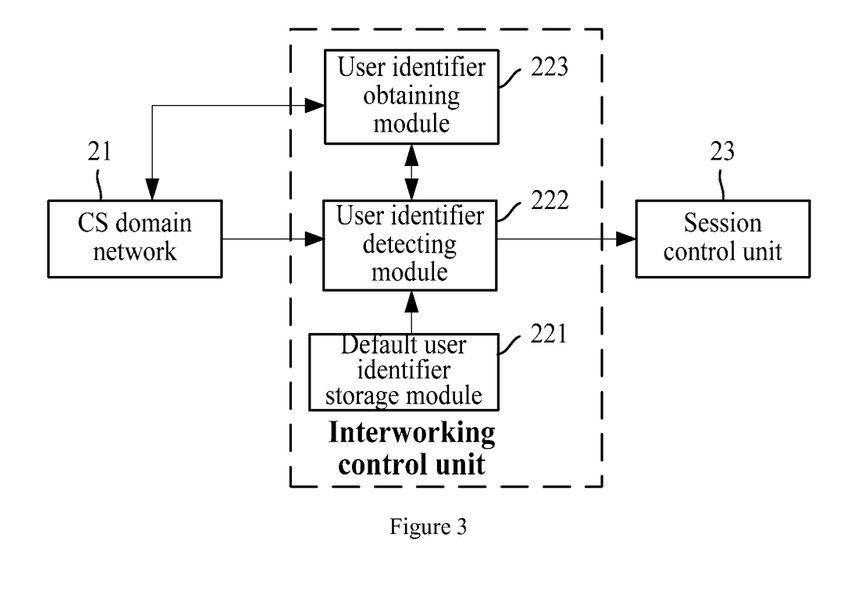
FIG. 3 shows the structure of an interworking control unit according to an embodiment of the present invention.

FIG. 3 shows the structure of a session control unit 22 according to an embodiment of the present invention. As shown in FIG. 3, the session control unit 22 includes:

a default user identifier storage module 221, adapted to store the default CS domain network user identifiers;

a user identification detecting module 222, adapted to receive the call signaling message sent by the CS domain network 21, and send an obtaining indication to the user identifier obtaining module 223 if detecting that the message carries no CS domain network user identifier; and a user identification obtaining module 223, adapted to send, according to the obtaining indication sent by the user identifier detecting module 222, a request for user identifier to the CS domain network 21, and put the CS domain network user identifier returned by the CS domain network 21 into the SIP message, which is subsequently sent to the IMS network.

Alternatively, the user identifier obtaining module 223 is adapted to send, according to the obtaining indication sent by the user identifier detecting module 222, a request for user identifier to the CS domain network 21, and if no CS domain network user identifier is received from the CS domain network 21, read the default user identifier from the default user identifier storage module 221, put the default user identifier into a SIP message, and send the SIP message to the IMS network.

Alternatively, the user identification obtaining module 223 is adapted to read, according to the obtaining indication sent by the user identifier detecting module 222, the default CS domain network user identifier from the default user identifier storage module 221, put the default CS domain network user identifier into a SIP message, and send the SIP message to the IMS network.

Figure 4:
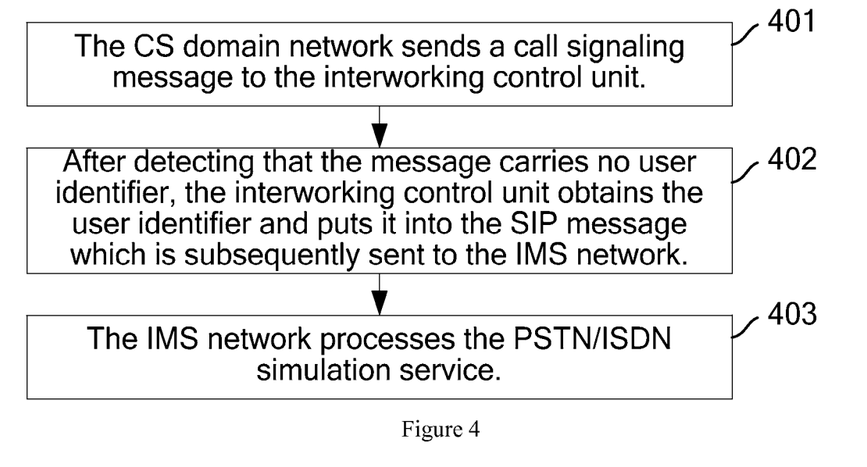
FIG. 4 shows the process for implementing a PSTN/ISDN simulation service according to an embodiment of the present invention.

FIG. 4 shows the process of implementing a PSTN/ISDN simulation service according to an embodiment of the present invention. As shown in FIG. 4, the process includes the following steps.

Step 401: The CS domain network sends a call signaling message to an interworking control unit.

Step 402: Upon receiving the call signaling message, if the interworking control unit detects that the message carries no CS domain network user identifier of the call, the interworking control unit obtains the CS domain network user identifier and puts the user identifier into the SIP message, which is subsequently sent to the IMS network.

The CS domain network user identifier may be a calling party identifier or a called party identifier.

The interworking control unit may obtain the CS domain network user identifier in the following two modes:

Mode 1: The interworking control unit presets a default CS domain network user identifier; if detecting that the call signaling message received from the CS domain network carries no CS domain network user identifier of the call, the interworking control unit puts the default CS domain network user identifier into a SIP message, which is subsequently sent to the IMS network.

The default CS domain network user identifier can be set freely, or determined according to the relevant information of each call, for example, according to the network in which the CS domain network user of a current call locates, the information of the circuit occupied by a call, the information of the trunk group that contains the circuit for a call, or the information of the Signaling Point Code (SPC) of the office where the CS domain network user of a current call locates.

The interworking control unit may put the default CS domain network user identifier into the SIP message in the following ways:

(i) In the header field for carrying the user identifier attribute information in the SIP message, adding a new parameter, which is adapted to indicate that the user identifier carried in this message is a default CS domain network user identifier, for example, adding an enumeration value default in the Privacy header field.

(ii) In the header field for carrying the user identifier in the SIP message, adding a new parameter, which is adapted to indicate that the user identifier carried in this message is a default CS domain network user identifier, for example, adding a keyword default in the user identifier P_Asserted_Identity header field.

(iii) In the SIP message, adding a header field dedicatedly used for indicating that the user identifier carried in the message is the default CS domain network user identifier.

Mode 2: The interworking control unit sends a request for user identifier to the CS domain network if detecting that the call signaling message received from the CS domain network carries no CS domain network user identifier of the call; Upon receiving the message, the CS domain network returns the CS domain network user identifier of the call to the interworking control unit.

If the interworking control unit receives no user identifier from the CS domain network, mode 1 may be adopted to obtain the default CS domain network user identifier.

Step 403: Upon receiving the message, the IMS network processes the PSTN/ISDN simulation service according to the CS domain network user identifier carried in the message.

The following takes the MCID, OIP and TIP services as examples to describe the present invention.

Figure 5:
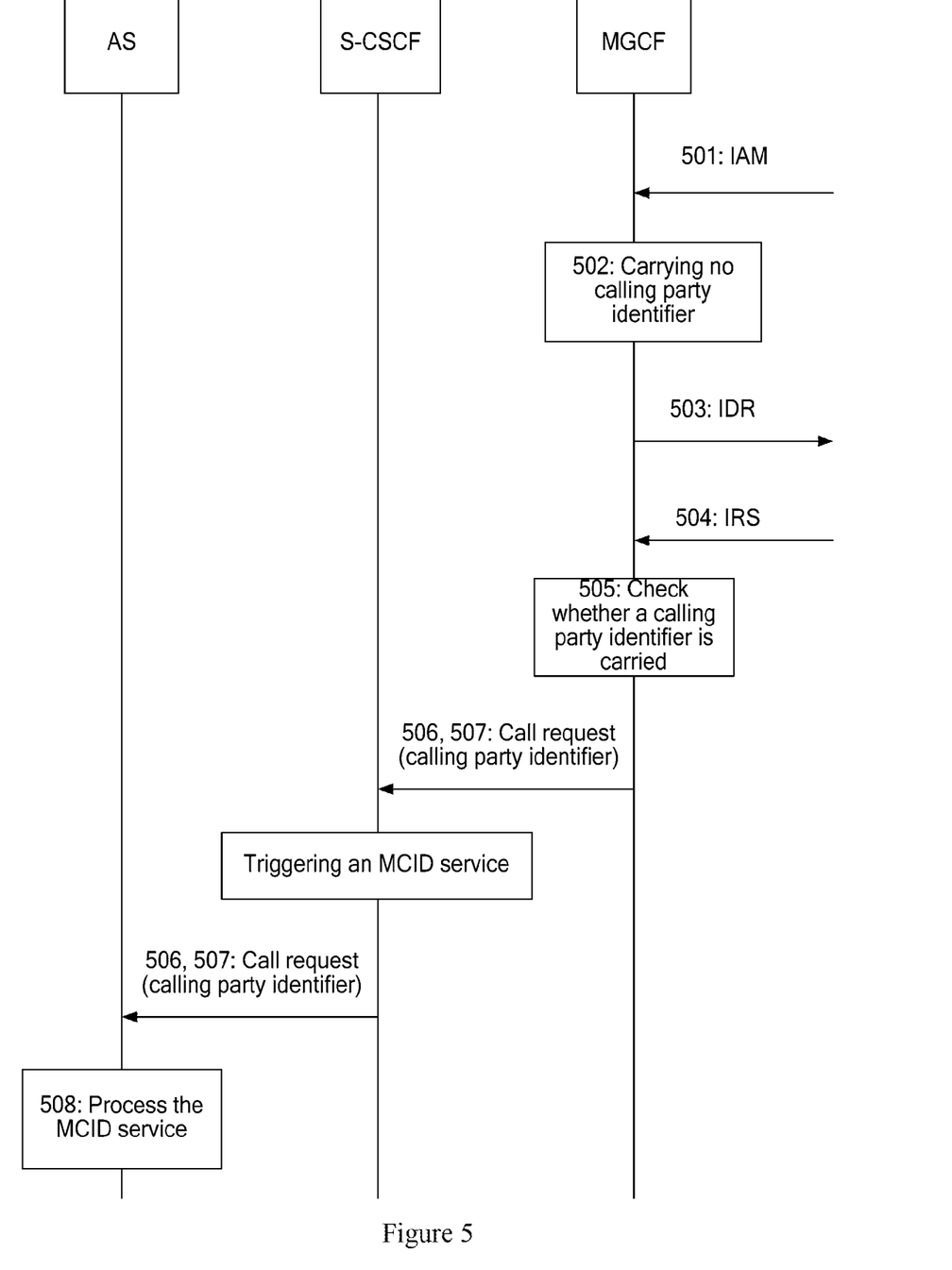
FIG. 5 shows the time sequence of implementing an MCID service according to an embodiment of the present invention.

FIG. 5 shows the time sequence diagram of implementing an MCID service according to an embodiment of the present invention. As shown in FIG. 5, the process includes the following steps.

Step 501: The user in the CS domain network sends a call request to call the user in an IMS network. Through the Initial Address Message (IAM) in the ISUP protocol, the CS domain network sends a call request to the MGCF that interworks with the IMS network, without putting the calling party identifier in the IAM message.

Step 502: Upon receiving the IAM message, the MGCF detects that the message carries no calling party identifier.

Step 503: The MGCF sends an IDR message to the CS domain network to request the calling party identifier.

Step 504: Upon receiving the IDR message, the CS domain network returns an IRS message to the MGCF.

Step 505: Upon receiving the IRS message, the MGCF judges whether the message carries a calling party identifier. If the message carries a calling party identifier, the process proceeds to step 506; otherwise the process skips to step 507.

For certain reasons, the CS domain network may be unable to obtain the calling party identifier, and hence returns an IRS message carrying no calling party identifier to the MGCF. For example, if the call request is sent from office A in the CS domain network through office B to the MGCF, office A knows the calling party identifier from the call request originated by the calling terminal, but the protocol message between office A and office B does not support carrying of a calling party identifier. Therefore, office A is unable to send the calling party identifier to office B. After office B receives an IDR message, because the calling party identifier is unavailable from office A, office B has to return the IRS message without the calling party identifier to the MGCF.

Step 506: The MGCF puts the calling party identifier in the IRS message into the call request (INVITE), which is sent by the S-CSCF to the AS in the IMS network. The process skips to step 408.

Step 507: The MGCF puts the stored default calling party identifier in the call request (INVITE), which is subsequently sent by the S-CSCF to the AS in the IMS network.

The MGCF may set the same default calling party identifier for all calls, or determine the default calling party identifier according to the relevant information of each call, for example, the network in which the calling party locates, the circuit occupied by the call, the trunk circuit for this call, and the SPC of the MGCF. In this embodiment, the MGCF may use the default Telephone Uniform Resource Identifier (TEL URI) tel: +0000-23 as the calling party identifier of the call, where 0000 means that the calling party identifier is the default identifier provided by the MGCF, 23 is the serial number of the trunk circuit for the call; alternatively, the MGCF uses a default SIP URI:DefaultIdCircuit23 @MGCF-.com as the calling party identifier of this call, where Circuit23 means that the serial number of the circuit occupied by the call is 23.

Step 508: Upon receiving the call request message, the AS in the IMS network processes the MCID service according to the calling party identifier in the message.

In practical applications, if the MGCF detects that the IAM carries no calling party identifier in step 502, the default calling party identifier can be put into the call request directly and sent to the S-CSCF, without the necessity of sending an IDR message to the CS domain network to obtain the calling party identifier.

Figure 6:
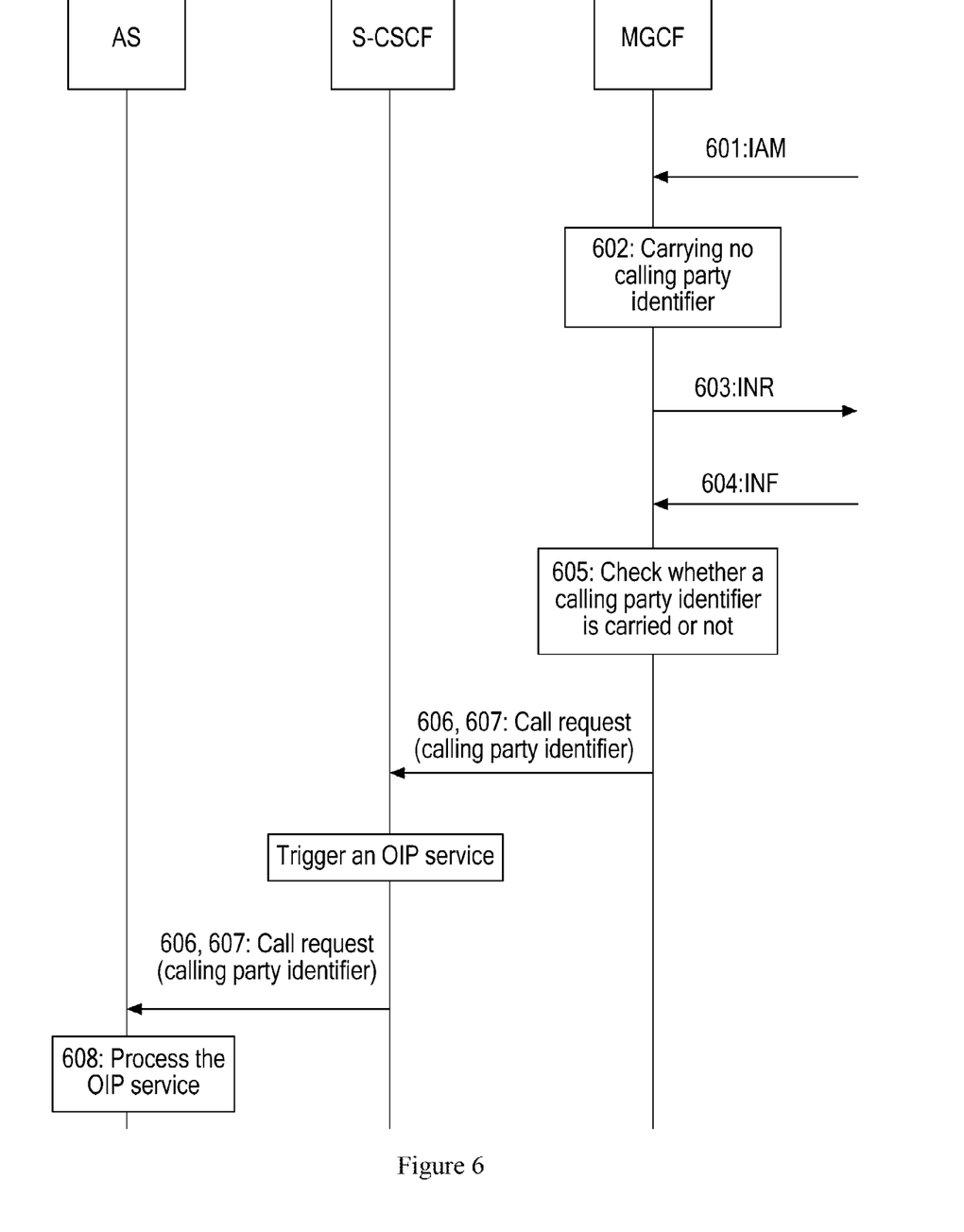
FIG. 6 shows the time sequence of implementing an OIP service according to an embodiment of the present invention.

FIG. 6 shows the time sequence of implementing an OIP service according to an embodiment of the present invention. As shown in FIG. 6, the process includes the following steps.

Step 601: The user in the CS domain network originates a call request to call the user in an IMS network. Through the Initial Address Message (IAM) in the ISUP protocol, the CS domain network sends a call request to the MGCF that interworks with the IMS network, without putting the calling party identifier in the IAM message.

Step 602: Upon receiving the IAM message, the MGCF detects that the message carries no calling party identifier.

Step 603: The MGCF sends an information request (INR) message to the CS domain network to request the calling party identifier.

Step 604: Upon receiving the INR message, the CS domain network returns an INF message to the MGCF.

Step 605: Upon receiving the INF message, the MGCF judges whether the message carries a calling party identifier. If the message carries a calling party identifier, the process proceeds to step 606; otherwise, the process proceeds to step 607.

Step 606: The MGCF puts the calling party identifier in the INF message into the call request (INVITE), which is sent by the S-CSCF to the AS in the IMS network. The process skips to step 608.

Step 607: The MGCF puts the stored default calling party identifier in the call request (INVITE), which is subsequently sent by the S-CSCF to the AS in the IMS network.

Step 608: Upon receiving the call request message, the AS in the IMS network processes the OIP service according to the calling party identifier in the message.

In practical applications, if the MGCF detects that the IAM carries no calling party identifier in step 602, the default calling party identifier can be put into the call request directly and sent to the S-CSCF, without the necessity of sending an INR message to the CS domain network to obtain the calling party identifier.

Figure 7:
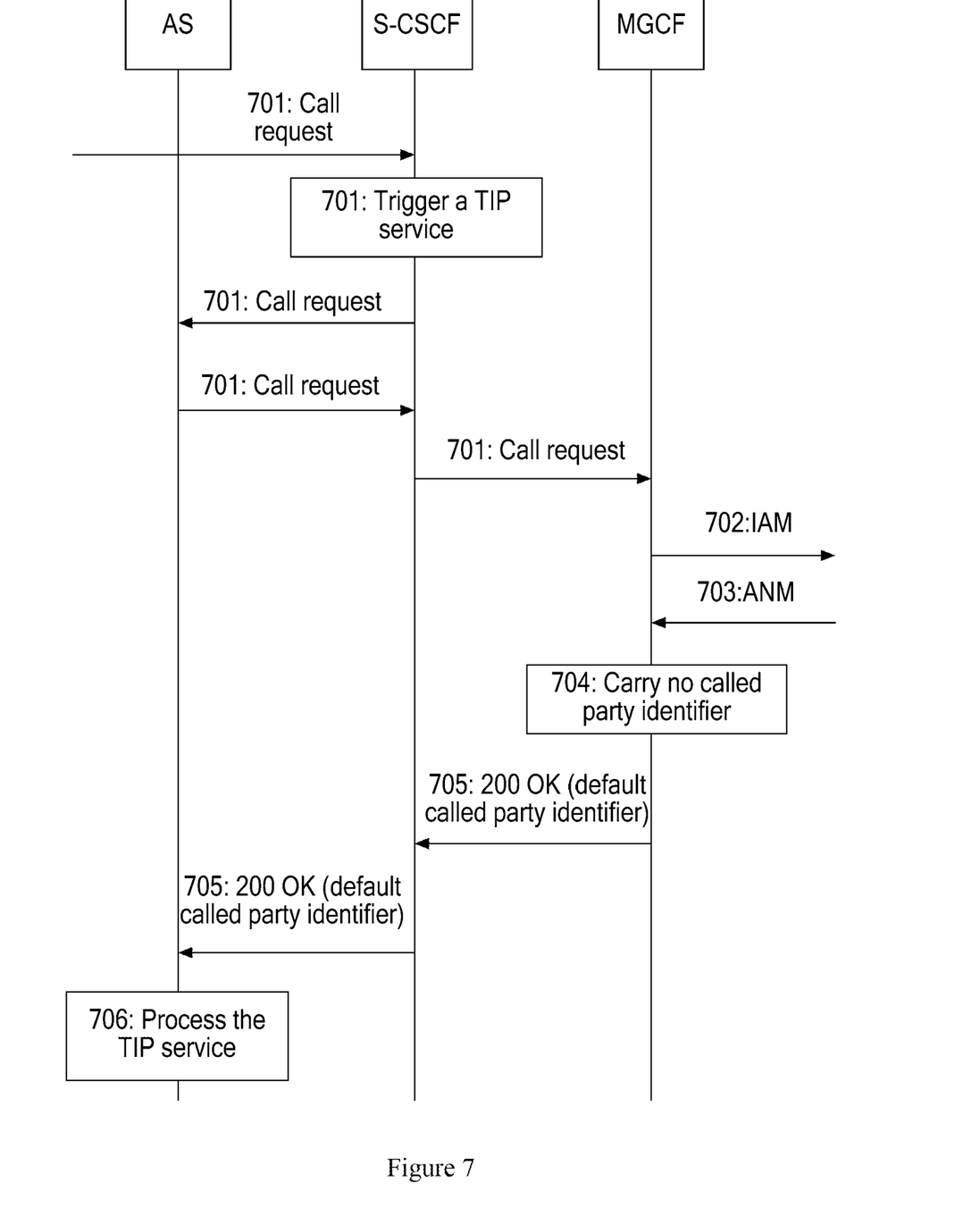
FIG. 7 shows the time sequence of implementing a TIP service according to an embodiment of the present invention.

FIG. 7 shows the time sequence of implementing a TIP service according to an embodiment of the present invention. As shown in FIG. 7, the process includes the following steps.

Step 701: The user in the IMS network sends a call request to call the user in a CS network. The IMS network sends a call request (INVITE) to the MGCF that interworks with the CS domain network.

Step 702: Upon receiving the call request message, the MGCF sends an IAM message to the CS domain network.

The IAM message may carry an indication that requests the called party identifier.

Step 703: Upon receiving the IAM message, the CS domain network returns an answer (ANM) message to the MGCF.

Step 704: Upon receiving the ANM message, the MGCF detects that the message carries no called party identifier.

Step 705: The MGCF puts the stored default called party identifier in the 200 OK message, which is subsequently sent by the S-CSCF to the AS in the IMS network.

Step 706: Upon receiving the 200 OK message, the AS in the IMS network processes the TIP service according to the called party identifier in the message.

The preceding embodiments are exemplary embodiments of the present invention only and not intended to limit the present invention. Any modification, equivalent substitution or improvement without departing from the spirit and principle of the present invention should be covered in the scope of protection of the present invention.

What is claimed is:

1. A method for implementing simulation services of a Public Switched Telephone Network/Integrated Service Digital Network (PSTN/ISDN) in an IP Multimedia Subsystem (IMS) network, the method comprising:
   determining, by an interworking control unit that interconnects the IMS network and a Circuit Switched (CS) domain network, that a received call signaling message from the CS domain network does not carry a CS domain network user identifier;
   based on the determination, obtaining, by the interworking control unit, the CS domain network user identifier without involving a request from an Application Server (AS);
   sending, by the interworking control unit, the obtained CS domain network user identifier to the IMS network; and
   processing, by the IMS network, PSTN/ISDN simulation services according to the obtained user identifier.

2. The method according to claim 1, wherein, the CS domain network user identifier is obtained from the CS domain network.

3. The method according to claim 1, wherein the CS domain network user identifier is a default user identifier preset by the interworking control unit and stored therein.

4. The method according to claim 3, wherein, the default user identifier comprises at least one of the following:
   the network in which the CS domain network user of a current call locates, the information of the circuit occupied by a call, the information of the trunk group that contains a circuit for the call, the information of the Signaling Point Code (SPC) of a office where the CS domain network user of this call locates, or identifier that the interworking control unit set freely.

5. The method according to claim 3, wherein, the sending, by the interworking control unit, the obtained CS domain network user identifier to the IMS network comprises:
   putting, by the interworking control unit, the default user identifier into a SIP message; and
   carrying an indication which indicates that the CS domain network user identifier is the default user identifier in the SIP message, which is subsequently sent to the IMS network.

6. The method according to claim 5, wherein, the carrying, by the interworking control unit, the indication which indicates the CS domain network user identifier is the default user identifier in the SIP message comprises:
   adding, by the interworking control unit, "default" indication in the Privacy header field of the SIP message; or
   adding, by the interworking control unit, "default" indication in the user identifier header field of the SIP message; or
   adding, by the interworking control unit, a header field special for indicating that the user identifier carried in the SIP message is the default user identifier.

7. The method according to claim 1, wherein, the PSTN/ISDN simulation services comprise Malicious Call Identification (MCID) services or Originator Identifier Presentation (OIP) services, and the obtaining the CS domain network user identifier comprises:

sending, by the interworking control unit, a request for the CS domain network user identifier to the CS domain network; and upon receiving the message, returning, by the CS domain network, the CS domain network user identifier of the call signaling message to the interworking control unit.

8. The method according to claim 7, wherein, after the interworking control unit sends a request for the CS domain network user identifier to the CS domain network, the method comprises:

if the interworking control unit receives no does not receive the CS domain network user identifier from the CS domain network, regarding the default user identifier as the CS domain network user identifier.

9. The method according to claim 7, wherein, the sending, by the interworking control unit, the obtained CS domain network user identifier to the IMS network comprises:

sending, by the interworking control unit, a calling user identifier to the IMS network through SIP request message.

10. The method according to claim 1, wherein, the PSTN/ISDN simulation services comprise Terminal Identifier Presentation (TIP) services, and the sending, by the interworking control unit, the obtained CS domain network user identifier to the IMS network comprises:

sending, by the interworking control unit, a called user identifier to the IMS network through SIP respond message.

11. A system for implementing simulation services of a Public Switched Telephone Network/Integrated Service Digital Network (PSTN/ISDN) in an IP Multimedia Subsystem (IMS) network, comprising:

a Circuit Switched (CS) domain network, adapted to send a call signaling message;

an interworking control unit that interconnects the IMS network and the CS domain network, adapted to receive the call signaling message and detecting the absence of a CS domain network user identifier, and obtain and send the CS domain network user identifier to the IMS network without involving a request from an Application Server (AS); and the IMS network, adapted to process PSTN/ISDN simulation services according to the CS domain network user identifier from the interworking control unit.

12. The system according to claim 11, wherein, the CS domain network is further adapted to receive the request for the CS domain network user identifier sent by the interworking control unit, and return the CS domain network user identifier to the interworking control unit.

13. The system according to claim 11, wherein, the interworking control unit comprises:

a default user identifier storage device and a user identification obtaining device, and wherein:

the default user identifier storage device is adapted to store default CS domain network user identifiers; and the user identification obtaining device is adapted to read a default CS domain network user identifier from the default user identifier storage device, put the default CS domain network user identifier into a SIP message, and send the SIP message to the IMS network after detecting that the call signaling message from the CS domain network does not carry the CS domain network user identifier.

14. The system according to claim 11, wherein, the interworking control unit comprises:

a user identifier detecting device and a user identifier obtaining device, and wherein, the user identifier detecting device is adapted to send an obtaining indication to the user identifier obtaining device if detecting that the message does not carry the CS domain network user identifier; and the user identifier obtaining device is adapted to send a request for the CS domain network user identifier to the CS domain network according to the obtaining indication sent by the user identifier detecting device, and put the CS domain network user identifier returned by the CS domain network into the SIP message, which is subsequently sent to the IMS network.

15. The system according to claim 11, wherein, the interworking control unit comprises a Media Gateway Control Function (MGCF) or an Interworking Border Control Function (IBCF).

16. An interworking control unit apparatus for implementing simulation services of a Public Switched Telephone Network/Integrated Service Digital Network (PSTN/ISDN) by interconnecting a Circuit Switched (CS) domain network and an IP Multimedia Subsystem (IMS) network, the apparatus comprising:

a default user identifier storage adapted to store default CS domain network user identifiers; and a processor adapted to determine the need for a CS domain network user identifier, obtain a default CS domain network user identifier from the default user identifier storage without involving a request from an Application Server (AS), read the default CS domain network user identifier from the default user identifier storage, put the default CS domain network user identifier into a SIP message, and send the SIP message to the IMS network after detecting that the call signaling message from the CS domain network does not carry the CS domain network user identifier.

17. An interworking control unit apparatus for implementing simulation services of a Public Switched Telephone Network/Integrated Service Digital Network (PSTN/ISDN) by interconnecting a Circuit Switched (CS) domain network and an IP Multimedia Subsystem (IMS) network, the apparatus comprising:

a processor;

a user identifier detecting device;

and a user identifier obtaining device, obtains a call signaling message from a CS domain network, sends an obtaining indication to the user identifier obtaining device when detecting that the message carries no CS domain network user identifier without involving a request from an Application Server (AS);

and wherein the user identifier obtaining device sends a request for the CS domain_network user identifier to the CS domain network according to the obtaining indication sent by the user identifier detecting device, and puts the CS domain network user identifier returned by the CS domain network into a SIP message, which is subsequently sent to the IMS network.

18. The interworking control unit apparatus according to claim 17, further comprises:

a default user identifier storage, adapted to store the default CS domain network user identifiers; and the user identification obtaining device, adapted to read a default CS domain network user identifier from the default user identifier storage, and put the default CS domain network user identifier into the SIP message and send the SIP message to the IMS network, when the call signaling message from the CS domain network does not carry the CS domain network user identifier.

19. The interworking control unit apparatus according to claim 17, comprising: a Media Gateway Control Function (MGCF) or an Interworking Border Control Function (IBCF).

20. The interworking control unit apparatus according to claim 17, further programmed to:
- add "default" indication in the Privacy header field of the SIP message; or
- add "default" indication in the user identifier header field of the SIP message.

* * * * *

UNITED STATES PATENT AND TRADEMARK OFFICE
CERTIFICATE OF CORRECTION

PATENT NO. : 9,055,083 B2  
APPLICATION NO. : 12/398644  
DATED : June 9, 2015  
INVENTOR(S) : Youzhu Shi et al.

Page 1 of 1

It is certified that error appears in the above-identified patent and that said Letters Patent is hereby corrected as shown below:

In the Claims

In column 9, claim 11, line 37, after "signaling message and" replace "detecting" with --detect--.

Signed and Sealed this  
Tenth Day of November, 2015

Michelle K. Lee  
*Director of the United States Patent and Trademark Office*